(12) United States Patent
Huang et al.

(10) Patent No.: US 12,164,205 B2
(45) Date of Patent: Dec. 10, 2024

(54) DISPLAY SUBSTRATE, LIQUID CRYSTAL DISPLAY PANEL AND DISPLAY DEVICE

(71) Applicants: Wuhan BOE Optoelectronics Technology Co., Ltd., Hubei (CN); BOE Technology Group Co., Ltd., Beijing (CN)

(72) Inventors: Xiaoyu Huang, Beijing (CN); Peng Jiang, Beijing (CN); Xiaoxiao Chen, Beijing (CN); Yuanhui Guo, Beijing (CN); Xia Shi, Beijing (CN); Jiantao Liu, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/768,824

(22) PCT Filed: Apr. 27, 2021

(86) PCT No.: PCT/CN2021/090334
§ 371 (c)(1),
(2) Date: Apr. 13, 2022

(87) PCT Pub. No.: WO2022/226804
PCT Pub. Date: Nov. 3, 2022

(65) Prior Publication Data
US 2024/0103327 A1    Mar. 28, 2024

(51) Int. Cl.
*G02F 1/1343*    (2006.01)
*G02F 1/1362*    (2006.01)
*G02F 1/1368*    (2006.01)

(52) U.S. Cl.
CPC .... *G02F 1/136286* (2013.01); *G02F 1/13624* (2013.01); *G02F 1/1368* (2013.01)

(58) Field of Classification Search
CPC .................................................... G02F 1/1362
See application file for complete search history.

(56) References Cited

U.S. PATENT DOCUMENTS

2015/0146127 A1    5/2015   Song et al.
2015/0338708 A1    11/2015  Li et al.
(Continued)

FOREIGN PATENT DOCUMENTS

| CN | 102156367 A | 8/2011 |
| CN | 103018980 A | 4/2013 |

(Continued)

*Primary Examiner* — Sang V Nguyen
(74) *Attorney, Agent, or Firm* — IPro, PLLC (57) ABSTRACT

Disclosed are a display substrate, a liquid crystal display panel (100) and a display device. The display substrate (9) includes: a base substrate (1), a plurality of sub-pixels arranged in an array on the base substrate, a plurality of data lines (D) extending in a first direction (X), a plurality of gate lines (G) extending in a second direction (Y), and a common electrode (2) arranged in a minimum area enclosed by the data lines and the gate lines; wherein the minimum area includes two sub-pixels, the common electrode includes a main electrode (21) with strip-shaped which is arranged at the junction of the two sub-pixels and a plurality of branch electrodes (22) with strip-shaped which are symmetrically distributed on two sides of the main electrode, and the extending directions of a part of the plurality of branch electrodes arranged on a same side of the main electrode are identical.

15 Claims, 11 Drawing Sheets

(56) References Cited

U.S. PATENT DOCUMENTS

| | | | |
|---|---|---|---|
| 2016/0266450 A1* | 9/2016 | Kim | G02F 1/133512 |
| 2017/0269438 A1 | 9/2017 | Wu et al. | |
| 2018/0095334 A1* | 4/2018 | Zang | G02F 1/133707 |
| 2018/0356692 A1 | 12/2018 | Okumoto | |
| 2020/0257143 A1* | 8/2020 | Murata | G02F 1/134309 |
| 2021/0056924 A1* | 2/2021 | Xiao | G09G 3/3688 |
| 2021/0109408 A1 | 4/2021 | Matsushima | |
| 2021/0333675 A1* | 10/2021 | Long | G02F 1/134345 |
| 2024/0055440 A1* | 2/2024 | Su | G02F 1/1368 |

FOREIGN PATENT DOCUMENTS

| | | | | |
|---|---|---|---|---|
| CN | 104570511 A | 4/2015 | | |
| CN | 105093726 A | 11/2015 | | |
| CN | 105388672 A | 3/2016 | | |
| CN | 105572996 A | 5/2016 | | |
| CN | 105938282 A | 9/2016 | | |
| CN | 110456585 A | 11/2019 | | |
| EP | 3477371 B1 | 9/2021 | | |
| KR | 20070020868 A | 2/2007 | | |
| KR | 20150004973 | * | 1/2015 | G02F 1/1343 |
| KR | 20150004973 A | 1/2015 | | |

* cited by examiner

DISPLAY SUBSTRATE, LIQUID CRYSTAL DISPLAY PANEL AND DISPLAY DEVICE

CROSS-REFERENCE TO RELATED APPLICATION

This application is a national phase entry under 35 U.S.C § 371 of International Application No. PCT/CN2021/090334, filed Apr. 27, 2021.

FIELD

The disclosure relates to the field of display, in particular to a display substrate, a liquid crystal display panel and a display device.

BACKGROUND

A liquid crystal display (LCD) panel is widely applied to a large-size display device due to the low power consumption of the LCD panel.

Particularly, when the size of a large-size display device is fixed, the higher the resolution ratio is, the more black matrixes are needed in an effective display area, so that the transmittance is reduced, and the display quality is influenced.

SUMMARY

The disclosure provides a display substrate, a liquid crystal display panel and a display device, and the solution is as follows.

Embodiments of the disclosure provide a display substrate, which includes:
- a base substrate, a plurality of sub-pixels arranged on the base substrate in an array, a plurality of data lines extending in a first direction, a plurality of gate lines extending in a second direction and a common electrode located in a minimum area enclosed by the plurality of data lines and the plurality of gate lines;
- the minimum area includes two sub-pixels, the common electrode includes a main electrode with strip-shaped, which is arranged at a junction of the two sub-pixels and a plurality of branch electrodes with strip-shaped, which are symmetrically distributed on two sides of the main electrode, and the extending directions of a part of the plurality of branch electrodes are identical, the part of the plurality of branch electrodes are arranged on a same side of the main electrode.

Optionally, in the embodiments of the disclosure, in the minimum area, the display substrate further includes pixel electrodes with block-shaped, and the pixel electrodes are between the base substrate and the common electrode, a quantity of the pixel electrodes is two, the pixel electrodes are in the sub-pixels respectively, and the main electrode and the two pixel electrodes are at least partially overlapped.

Optionally, in the embodiments of the disclosure, the plurality of sub-pixels include at least two rows of sub-pixels, two gate lines are arranged between two adjacent rows of sub-pixels in the at least two rows of sub-pixels, one of the two gate lines is coupled with one of the two adjacent rows of sub-pixels, and other one of the two gate lines is coupled with other row of the two adjacent rows of sub-pixels.

Optionally, in the embodiments of the disclosure, the display substrate further includes a first switch unit and a second switch unit in the minimum area, the pixel electrodes include a first sub-pixel electrode corresponding to the first sub-pixel in the two sub-pixels and a second sub-pixel electrode corresponding to the second sub-pixel in the two sub-pixels, a gate of the first switch unit is coupled with a first gate line in the plurality of gate lines, a first electrode of the first switch unit is coupled with a target data line in the plurality of data lines, and a second electrode of the first switch unit is coupled with the first sub-pixel electrode, a gate of the second switch unit is coupled with a second gate line in the plurality of gate lines, a first electrode of the second switch unit is coupled with the target data line, and a second electrode of the second switch unit is coupled with the second sub-pixel electrode.

Optionally, in the embodiments of the present disclosure, a range of width, extending in the second direction, of the main electrode extending in the second direction is [2 μm, 11 μm].

Optionally, in the embodiment of the disclosure, a range of an included angle between each of the plurality of branch electrodes and the main electrode is [5°, 20°].

Accordingly, the embodiments of the disclosure provide a liquid crystal display panel which includes:
- an opposite substrate and the display substrate of any one of the above embodiments, the display substrate is arranged opposite to the opposite substrate, and a liquid crystal layer arranged between the opposite substrate and the display substrate.

Optionally, in the embodiments of the disclosure, liquid crystal in the liquid crystal layer is negative liquid crystal.

Optionally, in the embodiment of the disclosure, the opposite substrate includes a plurality of color resistors and a shading part surrounding the plurality of color resistors, and an orthographic projection of the main electrode on the base substrate is completely covered by an orthographic projection of the shading part on the base substrate.

Correspondingly, the embodiments of the disclosure provide a display device, including: the liquid crystal display panel as described in any one of the above.

DETAILED DESCRIPTION OF THE EMBODIMENTS

In order to make the objective, technical solutions and advantages of the embodiments of the present disclosure clearer, the technical solutions of the embodiments of the present disclosure will be described clearly and completely with reference to the drawings of the embodiments of the present disclosure. Obviously, the described embodiments are a part of the embodiments of the present disclosure, but not all the embodiments of the present disclosure. The embodiments in the present disclosure and features in the embodiments may be mutually combined in the case of no conflict. Based on the described embodiments of the present disclosure, all other embodiments obtained by those of ordinary skill in the art without creative labor belong to the scope of protection of the present disclosure.

Unless additionally defined, the technical or scientific terms used by the present disclosure should be of general meaning understood by those of ordinary skills in the art to which the present disclosure belongs. Similar words such as "including" or "containing" used in the present disclosure mean that elements or objects appearing in front of the word cover elements or objects listed behind the word and equivalents thereof, without excluding other elements or objects.

It should be noted that the sizes and shapes of all graphs in the drawings do not reflect the true scale, and only intend to illustrate the content of the present disclosure. The same or similar reference numbers represent the same or similar elements or elements with the same or similar functions from beginning to end.

Figure 1:
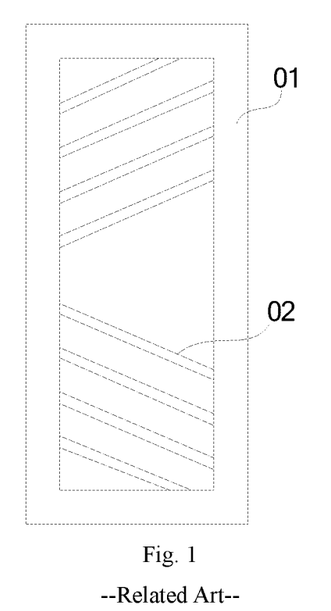
FIG. 1 is one of structural schematic diagrams of the common electrode in the art.

In the related art, in order to improve the transmittance of a liquid crystal display panel, a common electrode in the liquid crystal display panel is often designed to be strip-shaped, the common electrode shown in the FIG. 1 includes an annular structure 01 and a strip-shaped structure 02 which is arranged in the annular structure 01 and coupled with the annular structure 01, and due to the fact that the perimeter of the annular structure 01 is often long, in order to avoid breakage of the annular structure 01, the width of the annular structure 01 is usually set to be large, the wider annular structure 01 will affect the transmittance of the liquid crystal display panel, the narrow annular structure 01 is extremely prone to breakage, in addition, an electric field corresponding to a part of the annular structure 01 cannot make liquid crystal rotate, a dark field surrounding the part of the annular structure is large, and the transmittance is low. Therefore, how to design the common electrode in the liquid crystal display panel to improve the transmittance of the liquid crystal display panel is an urgent technical problem to be solved.

Therefore, the embodiments of the disclosure provide the display substrate, the liquid crystal display panel and the display device, which are used for improving the transmittance of the liquid crystal display panel and ensuring the display quality.

Figure 2:
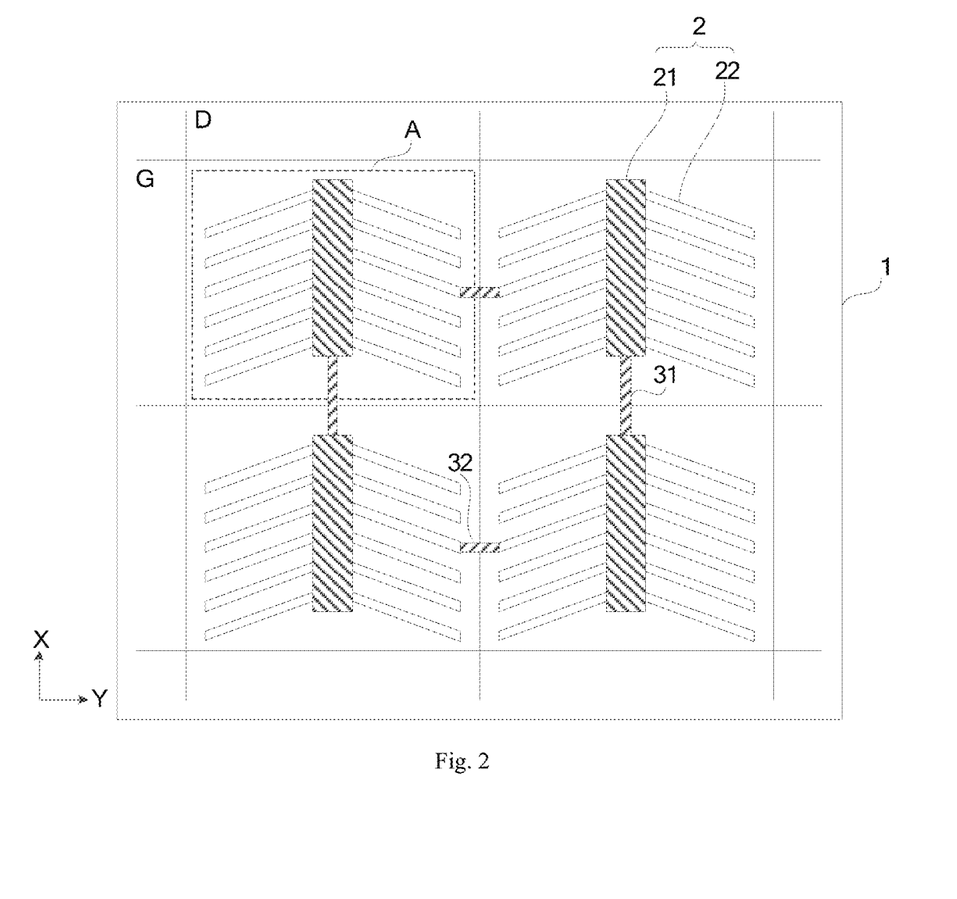
FIG. 2 is one of the structure schematic diagrams of the display substrate provided by the embodiment of the disclosure.

As shown in FIG. 2, the display substrate provided by the embodiment of the disclosure includes:

a base substrate 1, a plurality of sub-pixels arranged on the base substrate 1 in an array, a plurality of data lines D extending in the first direction X, a plurality of gate lines G extending in the second direction Y, and a common electrode 2 arranged in a minimum area enclosed by the plurality of data lines D and the plurality of gate lines G, that is, the minimum area is an area enclosed by the intersection of two adjacent data lines and two adjacent gate lines;

the minimum area includes two sub-pixels, the common electrode 2 includes: a main electrode 21 strip-shaped, the main electrode 21 is arranged at a junction of the two sub-pixels; and a plurality of branch electrodes 22 with strip-shaped, the plurality of branch electrodes 22 are symmetrically distributed on two sides of the main electrode 21;

the extending directions of a part of the plurality of branch electrodes 22 are identical, the part of the plurality of branch electrodes 22 are arranged on a same side of the main electrode 21.

In the embodiments of the disclosure, the base substrate 1 can be a silicon-based substrate and can also be a glass-based substrate, and the material of base substrate is not limited. The plurality of sub-pixels are arranged on the base substrate 1 in an array, and the quantity of the sub-pixels can be specifically set according to the size of the display substrate, the pixel resolution and the size of a single sub-pixel in practical application, which is not limited here.

Still in combination with FIG. 2, the first direction X can be a direction indicated by an arrow X, the second direction Y can be a direction indicated by an arrow Y, and the first direction X intersects with the second direction Y, so that a plurality of data lines D extending in the first direction X and a plurality of gate lines G extending in the second direction Y intersect with each other to form a plurality of pixel areas, a common electrode 2 is arranged in a minimum area enclosed by the data lines D and the gate lines G. In practical application, the number of the minimum areas enclosed by the data lines D and the gate lines G can be multiple. The minimum area includes two sub-pixels, that is, the minimum area corresponds to two pixel areas, and the minimum area is shown as a dotted frame A in FIG. 2. Besides, the common electrode 2 includes a main electrode with strip-shaped 21 which is arranged at the junction of the two sub-pixels and a plurality of branch electrodes 22 with strip-shaped which are symmetrically distributed on the two sides of the main electrode 21 and coupled with the main electrode 21, and the main electrode 21 can extend in the first direction X, that is, in each minimum area, the common electrode 2 includes a main electrode 21 with strip-shaped, a plurality of branch electrodes 22 arranged on one side of the main electrode 21 and a plurality of branch electrodes 22 arranged on the other side of the main electrode 21, and each branch electrode 22 arranged on the two sides of the main electrode 21 is coupled with the main electrode 21, so that in the minimum area, the directions of the electric fields of the branch electrodes 22 arranged on the same side of the main electrode 21 are identical, and therefore the display quality of the corresponding sub-pixel is guaranteed.

In the embodiments of the disclosure, the extension directions of a part of the plurality of branch electrodes 22 are identical, the part of the plurality of the branch electrodes are arranged on a same side of the main electrode 21 the branch electrodes 22 are arranged at intervals of the same distance, and the extension lengths and widths of the branch electrodes 22 are the same, that is, the sizes of the branch electrodes 22 arranged on the same side of the main electrode 21 are the same, and the branch electrodes 22 are uniformly distributed along the first direction X. In addition, due to the fact that the strip-shaped branch electrodes 22 arranged on the two sides of the main electrode 21 are symmetrically distributed, the display uniformity of all areas of the display substrate is guaranteed, and the display quality of the display substrate is further guaranteed.

It needs to be explained that the branch electrodes 22 arranged on the same side of the main electrode 21 cannot be strictly parallel due to the manufacturing process, the included angle between the extending direction of each branch electrode 22 can be within the preset included angle threshold range, for example, the included angle can range from 0° to 10°, and Accordingly, the included angle can be set according to actual application and is not limited here. Besides, in combination of FIG. 2, the display substrate further includes a first connecting part 31 used for connecting the two adjacent common electrodes 2 in the first direction X and a second connecting part 32 used for connecting the branch electrodes 22 corresponding to the two adjacent minimum areas. The second connecting part 32 can be coupled with the middle branch electrode in the multiple branch electrodes 22 in the common electrode 2 corresponding to a minimum area, it is guaranteed that the voltage of each row of sub-pixels is equal through the second connecting part 32, and therefore the use performance of the display substrate is guaranteed. Certainly, the specific position of the second connecting part 32 can be set according to actual application, and is not limited.

In the embodiments of the disclosure, the common electrode 2 in the minimum area enclosed by the data lines D and the gate lines G includes a main electrode 21 with strip-shaped which is arranged at the junction of two sub-pixels in the minimum area and a plurality of branch electrodes 22 with strip-shaped which are symmetrically distributed on the two sides of the main electrode 21, so that in the same minimum area, the width of the main electrode 21 arranged at the junction of the two sub-pixels can be set to be relatively wide, and the branch electrodes 22 symmetrically distributed on the two sides of the main electrode 21 and coupled with the main electrode 21 can be set to be relatively narrow; so that the breakage of the common electrode 2 can be prevented. At the same time, as the two sub-pixels can share the same main electrode 21, the quantity of the main electrodes 21 can be reduced when the number of the sub-pixels is large, so that the transmittance of the display substrate is effectively improved, and the display quality is ensured.

Figure 3:
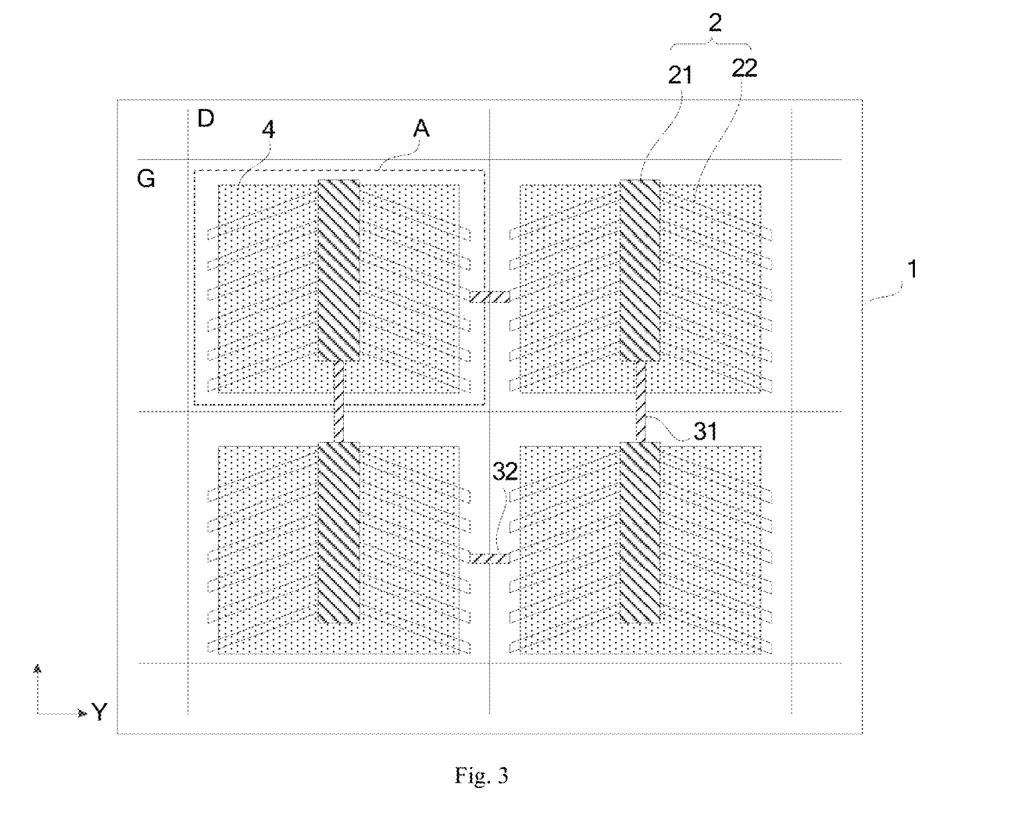
FIG. 3 is one of the structure schematic diagrams of the display substrate provided by the embodiment of the disclosure.

In the embodiments of the disclosure, FIG. 3 shows one of the structure schematic diagrams of the display substrate, specifically, in the minimum area, the display substrate further includes pixel electrodes 4 with block-shaped, the pixel electrodes 4 are arranged between the substrate 1 and the common electrode 2, the quantity of the pixel electrodes 4 is two, the pixel electrodes 4 are arranged in the sub-pixels respectively, and the main electrode 21 and the two pixel electrodes 4 are at least partially overlapped.

In an optional implementation process, in the minimum area, the display substrate further includes pixel electrodes 4 with block-shaped, the pixel electrodes 4 are arranged between the substrate 1 and the common electrode 2, the common electrode 2 and the pixel electrodes 4 are insulated from each other, the quantity of the pixel electrodes 4 is two, the pixel electrodes 4 are arranged in the sub-pixels respectively, and the main electrode 21 and the corresponding pixel electrodes 4 are at least partially overlapped, so that according to a capacitance formula $C=\varepsilon S/d$, the larger the overlapping area of the main electrode 21 and the corresponding pixel electrodes 4 is, the larger the corresponding pixel storage capacitance between the main electrode 21 and the corresponding pixel electrodes 4 is correspondingly, and therefore, the voltage of the display substrate is relatively stable, charges are not easy to shift, and residual images are not easy to appear: therefore, the display quality of the display substrate is ensured.

In an optional implementation process, the common electrode 2 and the pixel electrode 4 can be made of transparent conductive materials such as indium tin oxide (ITO), indium zinc oxide (IZO) materials, carbon nanotubes or graphene, and the materials for preparing the common electrode 2 and the pixel electrode 4 can be selected according to actual application requirements, and are not limited here.

Figure 4:
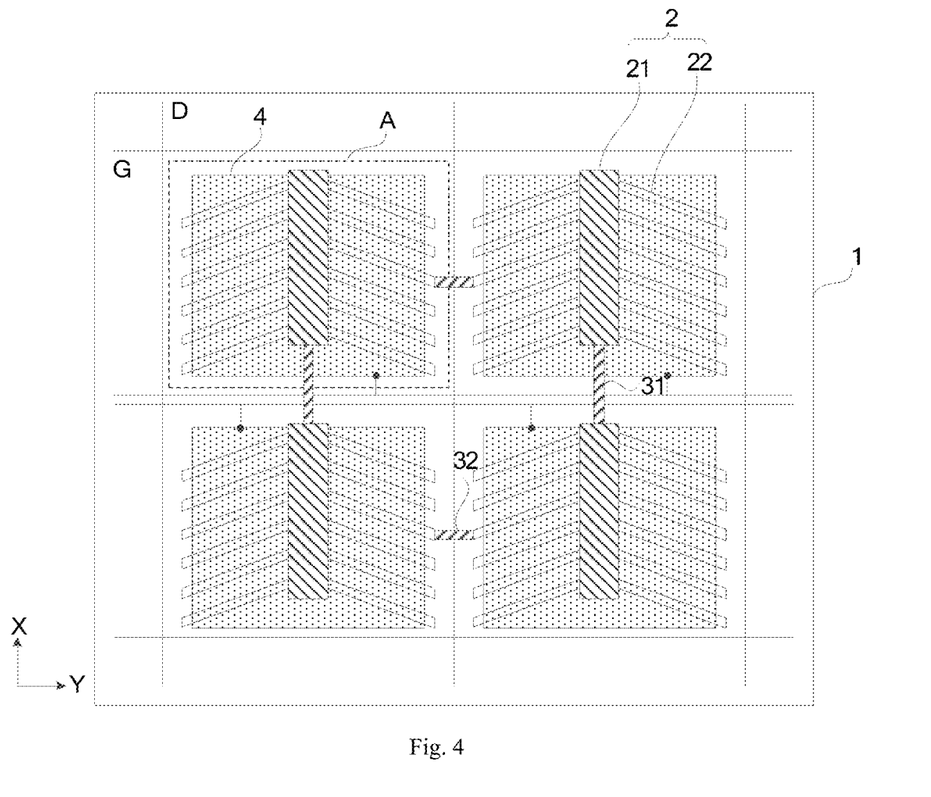
FIG. 4 is one of the structure schematic diagrams of the display substrate provided by the embodiment of the disclosure.

In the embodiments of the disclosure, FIG. 4 shows one of the structure schematic diagrams of the display substrate. The plurality of sub-pixels include at least two rows of sub-pixels, two gate lines G are arranged between two adjacent rows of sub-pixels in the at least two rows of sub-pixels. One of the two gate lines G is coupled with one of the two adjacent rows of sub-pixels, and the other one of the two gate lines G is coupled with the other row of the two adjacent rows of sub-pixels.

In an optional implementation process, the plurality of sub-pixels include at least two rows of sub-pixels, and in practical application, the specific row number of the at least two rows of sub-pixels can be set according to the size of the display substrate, the pixel resolution and the size of each sub-pixel, and is not limited here. Two gate lines G are arranged between two adjacent rows of sub-pixels in the at least two rows of sub-pixels, one of the two gate lines G is coupled with one row of the two adjacent rows of sub-pixels, and the other one of the two gate lines G is coupled with the other row of the two adjacent rows of sub-pixels, thus the display substrate is of a double-gate structure, compared with a single-gate structure, the number of driver integrated circuits (Driver ICs) is reduced by half, the distance between two adjacent driver ICs is enlarged, and therefore the difficulty of the bonding technology is reduced, the manufacturing cost of the display substrate is reduced, and meanwhile the production yield of the display substrate is increased.

Figure 5:
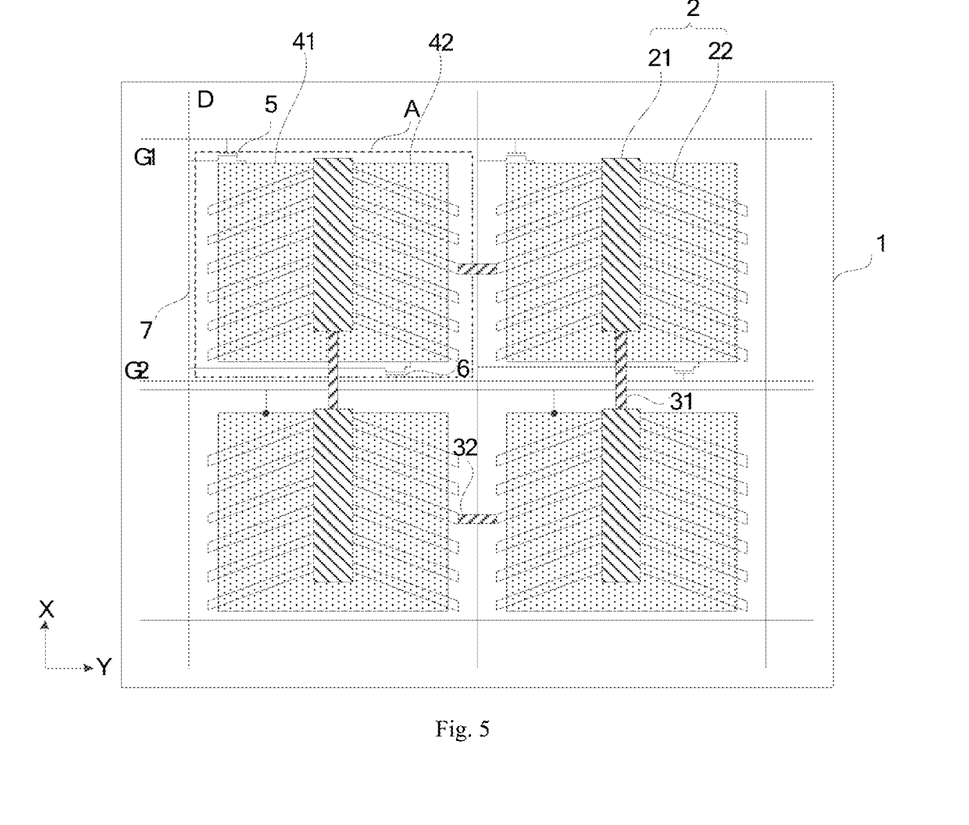
FIG. 5 is one of the structure schematic diagrams of the display substrate provided by the embodiment of the disclosure.

In the embodiments of the disclosure, FIG. 5 shows one of the structure schematic diagrams of the display substrate. In the minimum area, the display substrate further includes a first switch unit 5 and a second switch unit 6, the pixel electrodes 4 include a first sub-pixel electrode 41 corresponding to the first sub-pixel in the two sub-pixels, and a second sub-pixel electrode 42 corresponding to the second sub-pixel in the two sub-pixels. A gate of the first switch unit 5 is coupled with a first gate line G1 of the plurality of gate lines G, a first electrode of the first switch unit 5 is coupled with a target data line 7 of the plurality of data lines D, and a second electrode of the first switch unit 5 is coupled with the first sub-pixel electrode 41, the gate of the second switch unit 6 is coupled with the second gate line G2 in the multiple gate lines G, the first electrode of the second switch unit 6 is coupled with the target data line 7, and the second electrode of the second switch unit 6 is coupled with the second sub-pixel electrode 42.

In an optional implementation process, in the minimum area, the display substrate further includes a first switch unit 5 and a second switch unit 6, the first switch unit 5 and the second switch unit 6 can be a thin film transistor (TFT) and can also be a metal oxide semiconductor (MOS) field effect transistor, which is not limited here. The pixel electrode 4 includes a first sub-pixel electrode 41 corresponding to a first sub-pixel in the two sub-pixels and a second sub-pixel electrode 42 corresponding to a second sub-pixel in the two sub-pixels, a gate of the first switch unit 5 is coupled with a first gate line G1 in the plurality of gate lines, a first electrode of the first switch unit 5 is coupled with a target data line 7 in the plurality of data lines D, a second electrode of the first switch unit 5 is coupled with the first sub-pixel electrode 41, and a gate of the second switch unit 6 is coupled with a second gate line G2 in the plurality of gate lines G: a first electrode of the second switch unit 6 is coupled to the target data line 7, and a second electrode of the second switch unit 6 is coupled to the second sub-pixel electrode 42. Therefore, the target data line 7 can respectively input data signals to the two sub-pixels in one minimum area through the first switch unit 5 and the second switch unit 6, so that the use quantity of the plurality of data lines D is reduced, and the use amount of the driver integrated circuits can be reduced. Therefore, the production yield of the display substrate is improved while the manufacturing cost of the display substrate is reduced.

It needs to be explained that the functions of the first electrode and the second electrode of each switch unit can be exchanged according to the type of the switch unit and the difference of signals of the signal end, for example, the first electrode can be used as the source electrode, the second electrode can be used as the drain electrode correspondingly, and for another example, the first electrode can be used as the drain electrode, the second electrode can be used as the source electrode correspondingly, which is not limited here.

In the embodiments of the disclosure, a range of a width, extending along the second direction Y, of the main electrode 21 is [2 μm, 11 μm], and the width can include two endpoint values, that is, the width of the main electrode 21 extending along the second direction Y is greater than or equal to 2 μm and less than or equal to 11 μm, so that the width of the main electrode 21 extending in the second direction Y is not too narrow or too wide, and in practical application, the width of the main electrode 21 extending in the second direction Y can be set according to the size of pixel storage capacitance and the related characteristic that the common electrode 2 is not prone to breakage, for example, when the width of the main electrode 21 extending in the second direction Y is adjusted between 2 μm and 8 μm, accordingly the storage capacitance changes between 0.1 pF and 0.5 pF, for another example, for a 43-inch ultra-high-definition television, the maximum width of the main electrode 21 extending in the second direction Y can be set to be 10.6 μm, and the minimum width of the main electrode 21 extending in the second direction Y can be set to be 2 μm, and therefore the transmittance of the display substrate is guaranteed while the common electrode 2 is not prone to breakage. Certainly, the width of the main electrode 21 extending in the second direction Y can be set according to the actual application requirement, which is not limited here.

Figure 6:
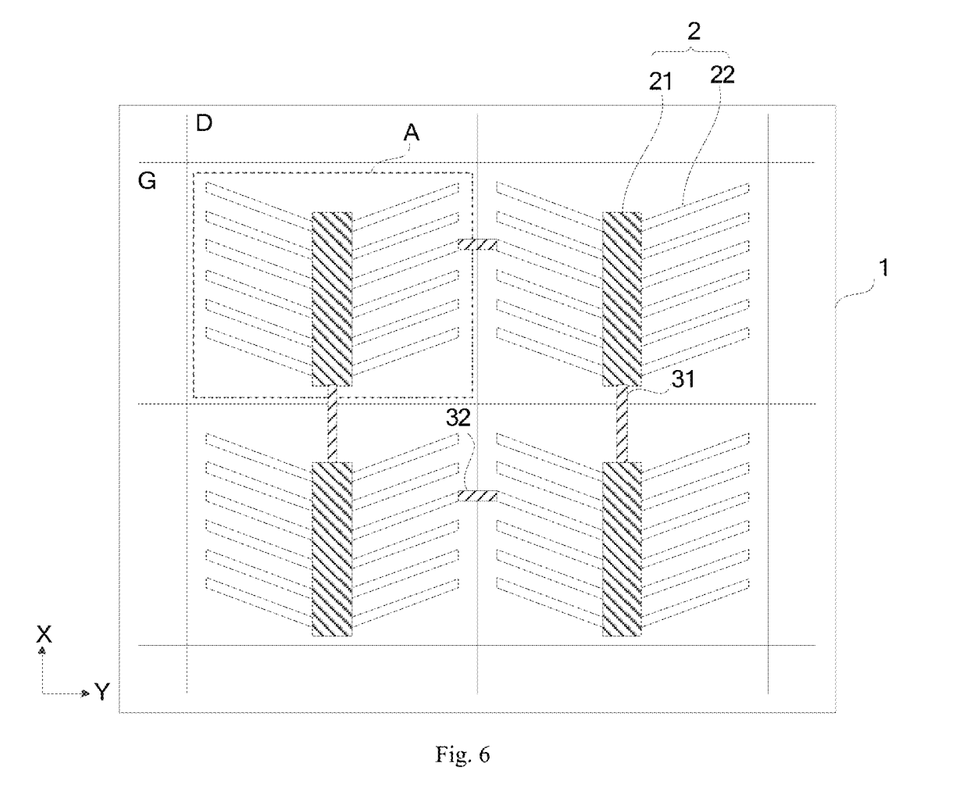
FIG. 6 is one of the structure schematic diagrams of the display substrate provided by the embodiment of the disclosure.

In the embodiments of the disclosure, a range of an included angle between each of the plurality of branch electrodes 22 and the main electrode 21 is [5°, 20°]. Wherein the included angle between each of the plurality of branch electrodes 22 and the main electrode 21 can be an angle smaller than 90° between the extending direction of the main electrode 21 and the extending direction, facing away from the main electrode 21, of the branch electrode 22, for example, the included angle between each of the plurality of branch electrodes 22 and the main electrode 21 is 7°, and for another example, the included angle between each of the plurality of branch electrodes 22 and the main electrode 21 is 11°, and correspondingly, the transmittance of the display substrate is high. Certainly, the specific included angle between each of the plurality of branch electrodes 22 and the main electrode 21 can be set according to practical application, which is not limited here. Besides, the common electrode 2 can be arranged by making the plurality of branch electrodes 22 extend in a direction close to the sub-pixels in the next row according to the FIG. 2, the common electrode 2 can also be arranged according to the FIG. 6, and at the moment, the branch electrodes 22 extend in the direction away from the sub-pixels in the next row: In practical application, the arrangement conditions of the main electrode 21 and the branch electrode 22 can be designed according to specific needs, and are not detailed.

Figure 7:
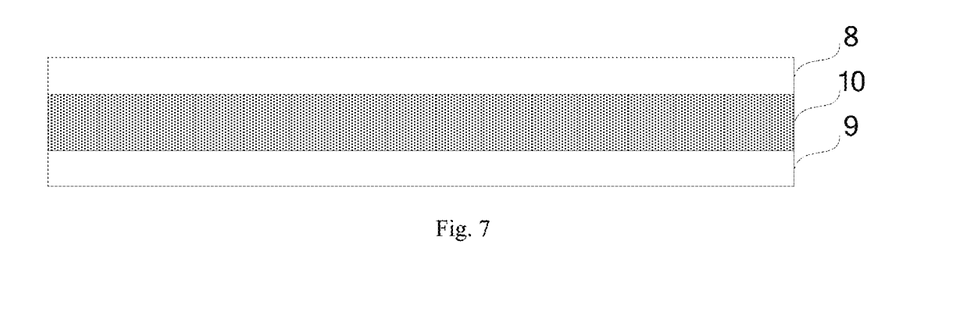
FIG. 7 is one of the structural schematic diagrams of the liquid crystal display panel provided by the embodiment of the disclosure.

Based on the same inventive concept, as shown in FIG. 7, the embodiments of the disclosure further provide a liquid crystal display panel, and the liquid crystal display panel includes:

the opposite substrate 8 and the display substrate 9 which are arranged opposite to the opposite substrate 8, and the liquid crystal layer 10 which is arranged between the opposite substrate 8 and the display substrate, and the display substrate 9 is any one of the above display substrates.

In an optional implementation process, the common electrode 2 and the pixel electrodes 4 in the display substrate 9 can drive the liquid crystal in a corresponding area in the liquid crystal layer 10 to deflect, the opposite substrate 8 is used for converting light from the display substrate 9 into colored light, the liquid crystal display panel can be a display panel in an advanced super-dimensional switch (ADS) mode, when the common electrode 2 in the display panel in the ADS mode is designed according to FIG. 1, the transmittance of the corresponding liquid crystal display panel can be greatly improved, and the liquid crystal display panel can be applied to the field of large-size televisions due to the fact that the liquid crystal display panel is good in visual angle characteristic and high in transmittance.

In the embodiments of the disclosure, the liquid crystal in the liquid crystal layer 10 is the negative liquid crystal, and the negative liquid crystal is not influenced by a vertical electric field in an ADS mode to cause inclination, so that the transmittance of the liquid crystal display panel is further improved, and the display quality of the liquid crystal display panel is improved.

Figure 8:
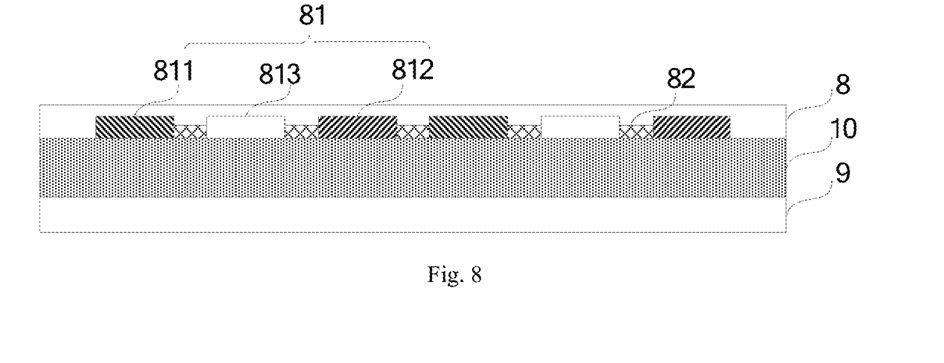
FIG. 8 is one of the structural schematic diagrams of the liquid crystal display panel provided by the embodiment of the disclosure.

In the embodiments of the disclosure, FIG. 8 is one of the structural schematic diagrams of the liquid crystal display panel, the opposite substrate 8 includes a plurality of color resistors 81 and a shading part 82 surrounding the plurality of color resistors 81; and an orthographic projection of the main electrode 21 on the substrate 1 is completely covered by an orthographic projection of the shading part 82 on the substrate 1.

In an optional implementation process, the opposite substrate 8 includes a plurality of color resistors 81, each of the plurality of color resistors 81 can be a combination of a red color resistor 811, a green color resistor 812 and a blue color resistor 813, and can also be a combination of a red color resistor, a green color resistor, a blue color resistor and a white color resistor, which is not limited here, FIG. 8 is a schematic diagram of each of the plurality of color resistors 81 including the combination of a red color resistor 811, a green color resistor 812 and a blue color resistor 813. Besides, the shading part 82, surrounding the plurality of color resistors 81, in the opposite substrate 8 can be a black matrix (BM), so that light rays around the sub-pixels can be effectively shaded. Moreover, the orthographic projection of the main electrode 21 on the substrate 1 is completely covered by the orthographic projection of the shading part 82 on the substrate 1, so that a dark area on the periphery of the main electrode 21 does not exceed the shading part, the dark area on the periphery of the main electrode 21 is prevented from being expanded to a pixel opening area, and the transmittance of the liquid crystal display panel is further improved.

Besides, when the liquid crystal in the liquid crystal layer 10 is negative liquid crystal, once the extending width of the main electrode 21 along the second direction Y is set to be large, impurity charges in the negative liquid crystal in the liquid crystal layer 10 are difficult to gather, even in a high temperature operation (HTO) test, the occurrence of residual image stains can be avoided, therefore, the use performance of the liquid crystal display panel is improved. In addition, the liquid crystal in the liquid crystal layer 10 can be positive liquid crystal, and the liquid crystal in the liquid crystal layer 10 can be selected according to practical application, which is not limited here.

Figure 9:
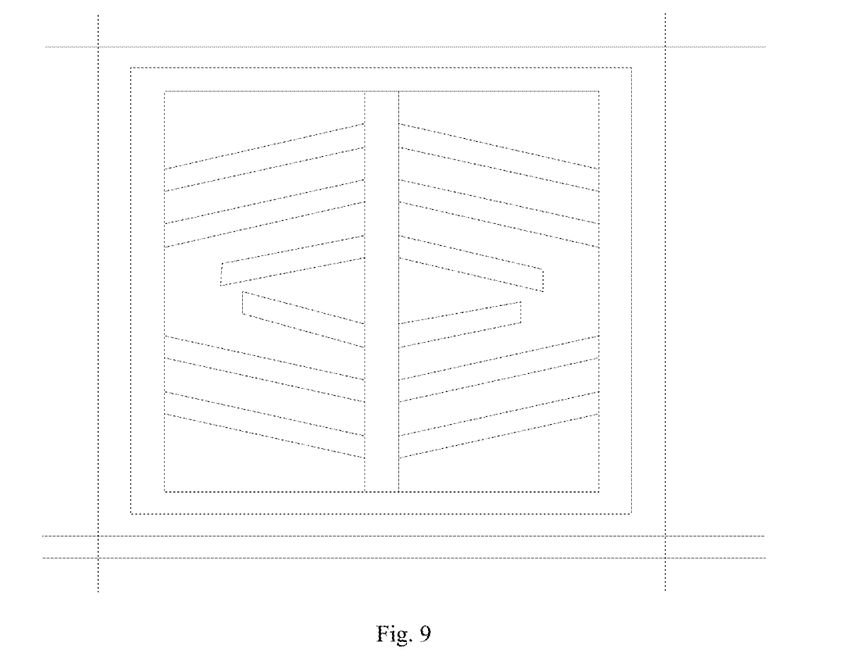
FIG. 9 is a partial structure schematic diagram of the common electrode applied to a corresponding display substrate in the liquid crystal display panel with the double-gate structure as shown in FIG. 1.
Figure 10:
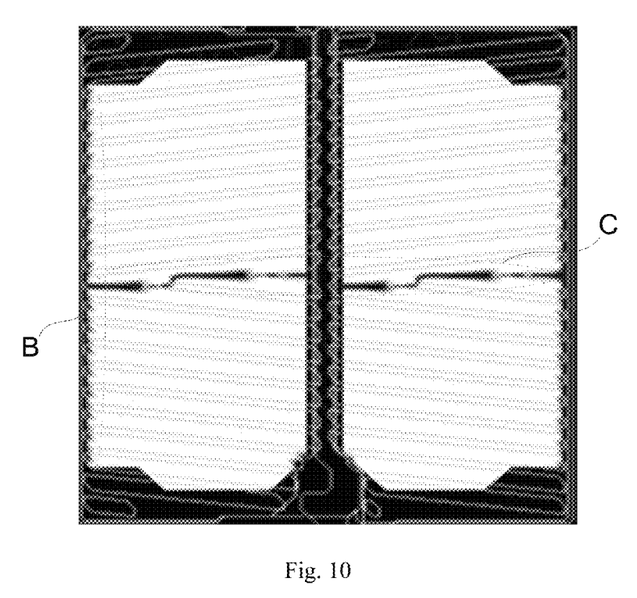
FIG. 10 is a lighting effect simulation schematic diagram of a corresponding part of FIG. 9.
Figure 11:
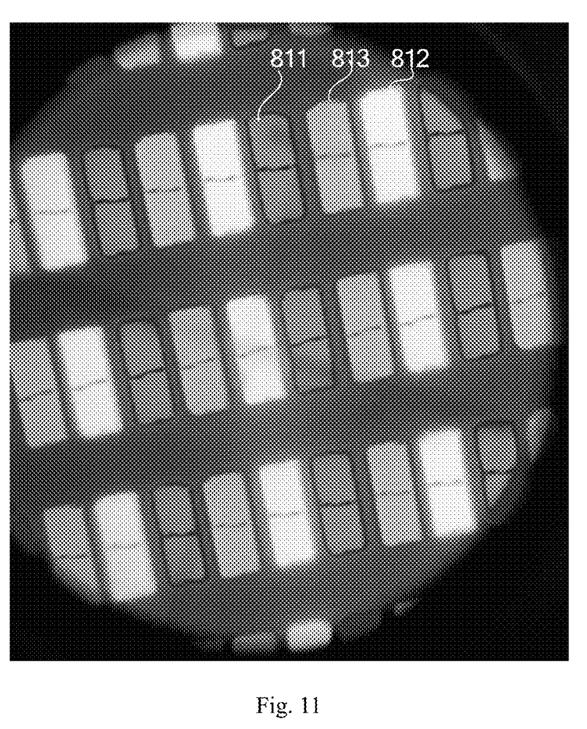
FIG. 11 is a display schematic diagram of sub-pixels in a partial area under a microscope when the common electrode shown in FIG. 1 is applied to the liquid crystal display panel of the double-gate structure.
Figure 12:
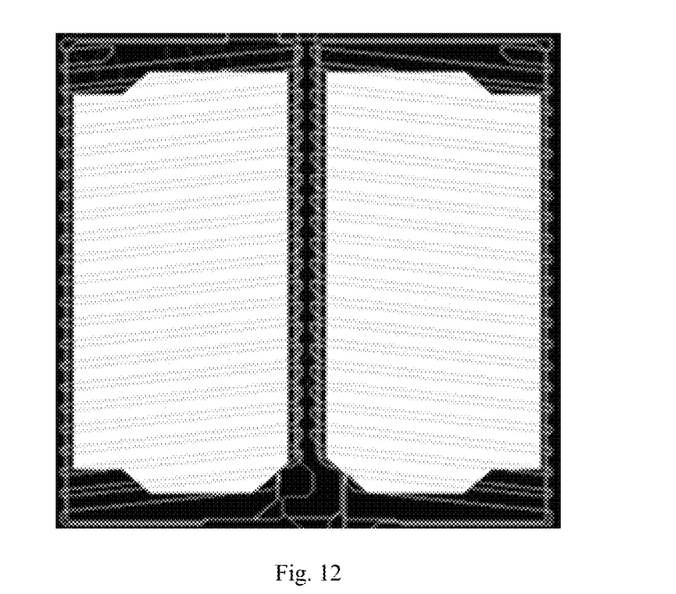
FIG. 12 is a lighting effect simulation schematic diagram when the opening areas of the sub-pixels in the FIG. 9 and the FIG. 2 are the same in size.
Figure 13:
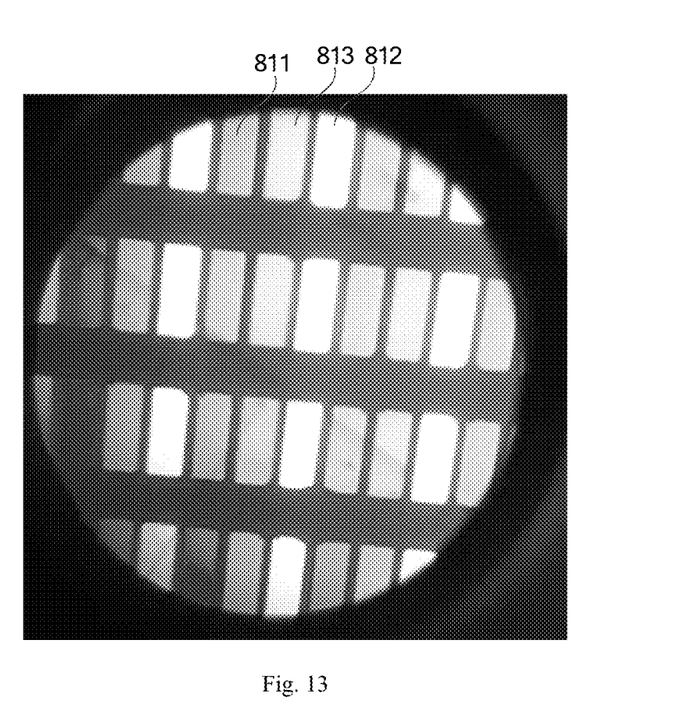
FIG. 13 is a display schematic diagram of the sub-pixels in a partial area in FIG. 7 under a microscope.

In the embodiments of the disclosure, when the common electrode shown in FIG. 1 is applied to the liquid crystal display panel with a double-gate structure, FIG. 9 shows a partial structure schematic diagram of the corresponding display substrate, since one sub-pixel, in the minimum area enclosed by the gate lines G and the data lines D, corresponds to two kinds of branch electrodes 22 in opposite directions, the liquid crystal cannot deflect towards a determined direction due to the electric field interaction in the middle part, resulting in illumination failure and a dark area (such as an area shown in a dotted frame B), and a corresponding lighting effect simulation schematic diagram is shown in FIG. 10. In addition, as the liquid crystal is in a flat state in an initial state, a main chain of the liquid crystal is completely perpendicular to the electric field of the liquid crystal, the liquid crystal cannot rotate, a dark area (such as an area shown by a dotted frame C) appears on the periphery of the main chain: FIG. 11 is a display schematic diagram of the sub-pixels in a partial area under a microscope when the common electrode shown in FIG. 1 is applied to the liquid crystal display panel with the double-gate structure: when the display substrate shown in FIG. 2 is applied to the liquid crystal display panel, FIG. 12 is a schematic diagram of the corresponding light effect simulation when the opening areas of the sub-pixels in FIG. 9 and FIG. 2 have the same size, and FIG. 13 is a display schematic diagram of the sub-pixels in a partial area in FIG. 7 under the microscope. Combined with FIG. 10 and FIG. 12, as well as FIG. 11 and FIG. 13, it is obvious that when the display substrate shown in FIG. 2 is adopted, the dark area on the periphery of the main electrode 21 is effectively reduced, and the transmittance of the liquid crystal display panel is improved, so that the display quality is guaranteed.

Besides, the specific structure of the display substrate 9 in the liquid crystal display panel can refer to the description of the display substrate part in the foregoing embodiment, the range of the included angle between the main electrode 21 and each of the plurality of branch electrodes 22 in the common electrode 2 in the display substrate 9 is [5°, 20°], and when the included angle between the main electrode 21 and each of the plurality of branch electrodes 22 in the liquid crystal display panel is [5° and 20°], the liquid crystal in the liquid crystal layer 10 is always high in deflection efficiency and high in lighting effect, so that the display quality of the liquid crystal display panel is ensured.

Figure 14:
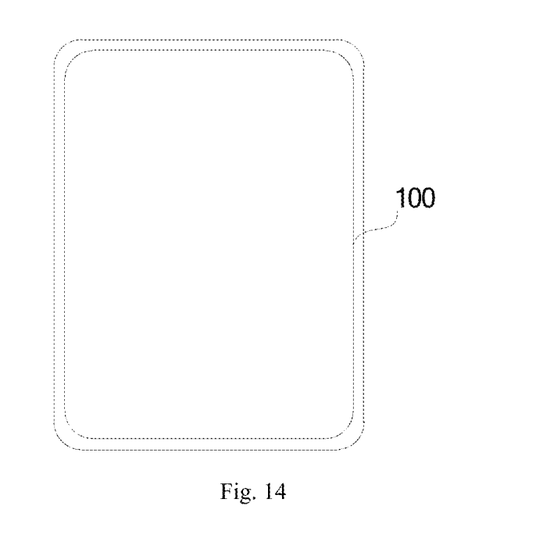
FIG. 14 is a structure schematic diagram of the display device provided by the embodiment of the disclosure.

Based on the same disclosed concept, as shown in FIG. 14, the embodiments of the disclosure further provide a display device, the display device includes the liquid crystal display panel 100, and the principle of the display device for solving problems is similar to that of the liquid crystal display panel 100, so that the implementation of the display device can refer to the implementation of the liquid crystal display panel 100, and the repetition is not repeated.

In an optional implementation process, the display device provided by the embodiments of the disclosure can be a mobile phone as shown in FIG. 14, and certainly, the display device provided by the embodiment of the disclosure can be any product or part with a display function, such as a tablet personal computer, a television, a display, a notebook computer, a digital photo frame, a navigator and the like. Other essential components of the display device should be understood to be possessed by those skilled in the art, and will not be repeated here, nor should it be used as a limitation of the present disclosure.

Although the preferred embodiments of the present disclosure have been described, those skilled in the art can make additional modifications and variations on these embodiments once they know the basic creative concept. Therefore, the appended claims are intended to be explained as including the preferred embodiments and all modifications and variations falling within the scope of the present disclosure.

Obviously, those skilled in the art can make various modifications and variations to the present application without departing from the spirit and scope of the present application. Thus, if these modifications and variations of the present application fall within the scope of the claims of the present application and the equivalent art, the present application is also intended to include these modifications and variations.

What is claimed is:

1. A display substrate, comprising:
    a base substrate;
    a plurality of sub-pixels arranged on the base substrate in an array;
    a plurality of data lines extending in a first direction;
    a plurality of gate lines extending in a second direction;
    and a common electrode arranged in a minimum area enclosed by the plurality of data lines and the plurality of gate lines; wherein
    the minimum area comprises two sub-pixels;
    the common electrode comprises:
        a main electrode with strip-shaped, and the main electrode is arranged at a junction of the two sub-pixels; and
        a plurality of branch electrodes with strip-shaped, and the plurality of branch electrodes are symmetrically distributed on two sides of the main electrode;
        wherein extending directions of a part of the plurality of branch electrodes are identical, the part of the plurality of branch electrodes are arranged on a same side of the main electrode;
        wherein the display substrate further comprises a first connecting part connected between main electrodes of two adjacent common electrodes in the first direction, and a width of the first connecting part in the second direction is less than widths of the main electrodes of the two adjacent common electrodes in the second direction; and wherein the display substrate further comprises a second connecting part arranged between two adjacent minimum areas in the second direction, and the second connecting part is connected with branch electrodes corresponding to the two adjacent minimum areas.

2. The display substrate according to claim 1, wherein:
in the minimum area, the display substrate further comprises pixel electrodes with block-shaped, and the pixel electrodes are between the base substrate and the common electrode,
a quantity of the pixel electrodes is two, the pixel electrodes are in the sub-pixels respectively; and
the main electrode and the two pixel electrodes are at least partially overlapped.

3. The display substrate according to claim 1, wherein:
the plurality of sub-pixels comprise at least two rows of sub-pixels, two gate lines are arranged between two adjacent rows of sub-pixels in the at least two rows of sub-pixels, one of the two gate lines is coupled with one row of the two adjacent rows of sub-pixels, and other one of the two gate lines is coupled with other row of the two adjacent rows of sub-pixels.

4. The display substrate according to claim 2, wherein:
the display substrate further comprises a first switch unit and a second switch unit in the minimum area;
the pixel electrodes comprise a first sub-pixel electrode corresponding to the first sub-pixel in the two sub-pixels and a second sub-pixel electrode corresponding to the second sub-pixel in the two sub-pixels;
wherein a gate of the first switch unit is coupled with a first gate line in the plurality of gate lines, a first electrode of the first switch unit is coupled with a target data line in the plurality of data lines, and a second electrode of the first switch unit is coupled with the first sub-pixel electrode, a gate of the second switch unit is coupled with a second gate line in the plurality of gate lines, a first electrode of the second switch unit is coupled with the target data line, and a second electrode of the second switch unit is coupled with the second sub-pixel electrode.

5. The display substrate according to claim 1, wherein, a range of a width, extending in the second direction, of the main electrode is [2 µm, 11 µm].

6. The display substrate according to claim 1, wherein, a range of an included angle between each of the plurality of branch electrodes and the main electrode is [5°, 20°].

7. A liquid crystal display panel, comprising:
an opposite substrate;
a display substrate arranged opposite to the opposite substrate; and
a liquid crystal layer arranged between the opposite substrate and the display substrate;
wherein the display substrate comprises:
a base substrate;
a plurality of sub-pixels arranged on the base substrate in an array;
a plurality of data lines extending in a first direction;
a plurality of gate lines extending in a second direction;
and a common electrode arranged in a minimum area enclosed by the plurality of data lines and the plurality of gate lines; wherein the minimum area comprises two sub-pixels;
the common electrode comprises:
a main electrode with strip-shaped, and the main electrode is arranged at a junction of the two sub-pixels; and
a plurality of branch electrodes with strip-shaped, and the plurality of branch electrodes are symmetrically distributed on two sides of the main electrode;
wherein extending directions of a part of the plurality of branch electrodes are identical, the part of the plurality of branch electrodes are arranged on a same side of the main electrode;
wherein the display substrate further comprises a first connecting part connected between main electrodes of two adjacent common electrodes in the first direction, and a width of the first connecting part in the second direction is less than widths of the main electrodes of the two adjacent common electrodes in the second direction; and
wherein the display substrate further comprises a second connecting part arranged between two adjacent minimum areas in the second direction, and the second connecting part is connected with branch electrodes corresponding to the two adjacent minimum areas.

8. The liquid crystal display panel according to claim 7, wherein, liquid crystal in the liquid crystal layer is negative liquid crystal.

9. The liquid crystal display panel according to claim 7, wherein the opposite substrate comprises:
a plurality of color resistors;
a shading part surrounding the plurality of color resistors; and
an orthographic projection of the main electrode on the base substrate is completely covered by an orthographic projection of the shading part on the base substrate.

10. A display device, comprising:
the liquid crystal display panel according to claim 7.

11. The liquid crystal display panel according to claim 7, wherein
in the minimum area, the display substrate further comprises pixel electrodes with block-shaped, and the pixel electrodes are between the base substrate and the common electrode,
a quantity of the pixel electrodes is two, the pixel electrodes are in the sub-pixels respectively; and
the main electrode and the two pixel electrodes are at least partially overlapped.

12. The liquid crystal display panel according to claim 7, wherein:
the plurality of sub-pixels comprise at least two rows of sub-pixels, two gate lines are arranged between two adjacent rows of sub-pixels in the at least two rows of sub-pixels, one of the two gate lines is coupled with one row of the two adjacent rows of sub-pixels, and other one of the two gate lines is coupled with other row of the two adjacent rows of sub-pixels.

13. The liquid crystal display panel according to claim 11, wherein
the display substrate further comprises a first switch unit and a second switch unit in the minimum area;
the pixel electrodes comprise a first sub-pixel electrode corresponding to the first sub-pixel in the two sub-pixels and a second sub-pixel electrode corresponding to the second sub-pixel in the two sub-pixels;

wherein a gate of the first switch unit is coupled with a first gate line in the plurality of gate lines, a first electrode of the first switch unit is coupled with a target data line in the plurality of data lines, and a second electrode of the first switch unit is coupled with the first sub-pixel electrode, a gate of the second switch unit is coupled with a second gate line in the plurality of gate lines, a first electrode of the second switch unit is coupled with the target data line, and a second electrode of the second switch unit is coupled with the second sub-pixel electrode.

14. The liquid crystal display panel according to claim 7, wherein, a range of a width, extending in the second direction, of the main electrode is [2 μm, 11 μm].

15. The liquid crystal display panel according to claim 7, wherein, a range of an included angle between each of the plurality of branch electrodes and the main electrode is [5°, 20°].

* * * * *